*Crider & Williams,*
*Mounting Artificial Teeth.*
Nº 10,127. Patented Oct. 18, 1853.
Fig 1.
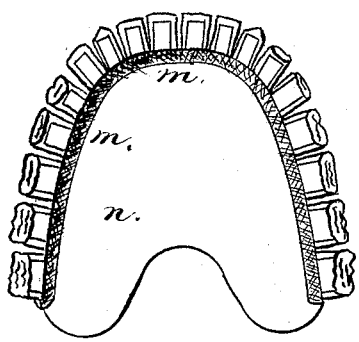
Fig: 2.
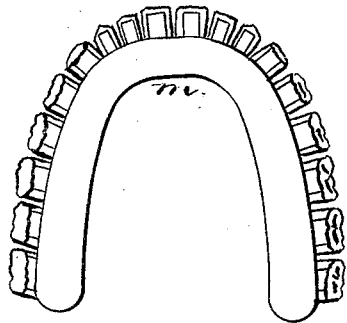
Fig: 3.
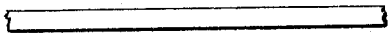
Fig 4.
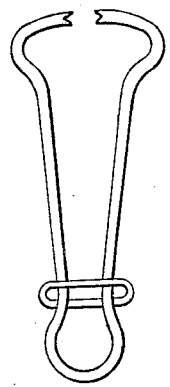
AM. PHOTO-LITHO. CO. N.Y. (OSBORNE'S PROCESS.)

UNITED STATES PATENT OFFICE.

HENRY L. CRIDER AND DAVID WILLIAMS, OF LANCASTER, OHIO.

ATTACHING ARTIFICIAL TEETH TO THE METALLIC PLATE.

Specification of Letters Patent No. 10,127, dated October 18, 1853.

*To all whom it may concern:*

Be it known that we, HENRY L. CRIDER and DAVID WILLIAMS, of Lancaster, in the county of Fairfield and State of Ohio, have invented a new and useful Improvement in Mechanical Dentistry; and we do hereby declare that the following is a full, clear, and exact description of the construction and operation of the same, reference being had to the annexed drawings, forming part of this specification, in which—

Figure 1 represents a bottom view of a set of artificial teeth, fastened according to our improved method. Fig. 2 is a view of the narrow plate with the teeth affixed. Fig. 3 shows the manner of cutting the solder. Fig. 4 is a view of the clamp employed.

Similar letters refer to the same parts.

By the old method of securing teeth, only one plate is used; the plate giving the impression of the mouth; the artificial teeth being soldered to the alveolar ridge of this plate with gold solder, which requires an intense heat to melt it. This intense heat very frequently altogether destroys the adaptation of the plate, and renders it useless, as will be seen by the following extract from *Harris's Principles and Practice of Dental Surgery*, fourth edition: "However accurately a plate may be made to fit the model, it is sometimes warped in soldering the teeth to it, destroying its adaptation, and causing it to rock when placed in the mouth. When this happens it cannot be made to adhere to the gums, and consequently cannot be worn.". (Page 727.)

The object of our improvement is to overcome this difficulty.

The invention consists in constructing a plate *m*, to which is fastened the artificial teeth, of such shape and width as to nicely and exactly fit over the convex surface of the alveolar ridge of the plate *n* which is the impression of the mouth. The plate *m* corresponds in length to the number of teeth to be fastened to it, and has its edges so filed down, on the inside, as to exactly fit along upon the sides of the alveolar ridge of the plate *n*, to which it is fastened, so as to make no inequality in the surface, and prevent the solder from escaping, when the plates are fastened by the method of soldering.

The operation of our improvement is as follows: The teeth are first attached to the plate *m* by gold solder in the usual manner, after which the plate *m* is fastened upon the alveolar ridge of the plate *n* either by riveting or soldering with soft solder. In the latter case the alveolar ridge of the plate *n* is washed with a preparation of sal ammonia dissolved in water; we then take the necessary quantity of solder, about the width shown in Fig. 3, and cut in the form of the alveolar ridge, also washed over with the aforesaid preparation of sal ammonia dissolved in water, and place the same between the surfaces of plate *m* and the alveolar ridge of plate *n*, which is the impression of the mouth, and over which the plate *m* exactly fits as above stated. To secure the plates in position during the act of soldering, they are fastened to each other by the requisite number of clamps shown in Fig. 4. The solder is melted by a gentle heat applied to the concave surface of the alveolar ridge, which will cause the two plates to adhere firmly and immovably to each other. The solder we employ consists of silver, block tin and lead in equal parts, though we do not confine ourselves to that composition or the before described mode of procedure.

What we claim as our invention and desire to secure by Letters Patent, is—

Securing the artificial teeth to the plate *m* by the usual method, and afterward fastening said plate on the alveolar ridge of the plate having the impression of the mouth, either by riveting or the employment of soft solder, so as to prevent the application to the plate (having the impression,) of the intense heat required to secure the teeth, as, and for the purpose herein fully set forth.

H. L. CRIDER.
DAVID WILLIAMS.

Witnesses:
 H. SCOTT,
 JOSEPH A. SHAW.